(12) United States Patent
Wetzig et al.

(10) Patent No.: US 11,199,468 B2
(45) Date of Patent: Dec. 14, 2021

(54) LEAK-TIGHTNESS TEST WITH CARRIER GAS IN FOIL CHAMBER

(71) Applicant: Inficon GmbH, Cologne (DE)

(72) Inventors: Daniel Wetzig, Cologne (DE); Silvio Decker, Cologne (DE)

(73) Assignee: Inficon GmbH, Cologne (DE)

( * ) Notice: Subject to any disclaimer, the term of this patent is extended or adjusted under 35 U.S.C. 154(b) by 176 days.

(21) Appl. No.: 15/532,423

(22) PCT Filed: Nov. 25, 2015

(86) PCT No.: PCT/EP2015/077636
§ 371 (c)(1),
(2) Date: Jun. 1, 2017

(87) PCT Pub. No.: WO2016/087280
PCT Pub. Date: Jun. 9, 2016

(65) Prior Publication Data
US 2017/0268957 A1    Sep. 21, 2017

(30) Foreign Application Priority Data

Dec. 3, 2014    (DE) .................. 10 2014 224 799.3

(51) Int. Cl.
*G01M 3/32*    (2006.01)
(52) U.S. Cl.
CPC ........ *G01M 3/3281* (2013.01); *G01M 3/3218* (2013.01)
(58) Field of Classification Search
CPC .. G01M 3/3281; G01M 3/3218; G01M 3/329;
G01M 3/04; G01M 3/22; G01M 3/226;
G01M 3/227; G01M 3/3254; G01M
3/3263; G01M 3/34; B65B 3/04; Y10T
29/49771; Y10T 29/53022
(Continued)

(56) References Cited

U.S. PATENT DOCUMENTS 3,888,111 A * 6/1975 Craig .................... G01M 3/202
73/40.7
4,055,984 A * 11/1977 Marx .................... G01M 3/027
73/40.7
(Continued)

FOREIGN PATENT DOCUMENTS

DE    19642099 A1    4/1998
DE    10040074 A1    2/2002
(Continued)

*Primary Examiner* — Nimeshkumar D Patel
*Assistant Examiner* — Gedeon M Kidanu
(74) *Attorney, Agent, or Firm* — Kirton McConkie;
Whitney Blair; Craig Metcalf

(57) ABSTRACT

A method for performing a leak-tightness test on a test object (16) in a foil chamber (10) which has at least one flexible wall region (12, 14), having the steps: using a gas or gas constituent contained in the test object as test gas for the leak-tightness test, introducing the test object into the foil chamber, evacuating the foil chamber to a pressure lower than the test gas pressure within the test object and than atmospheric pressure, introducing a carrier gas into the foil chamber into the region outside the test object, and measuring the test gas concentration of the gas mixture that forms in the foil chamber in the region outside the test object.

6 Claims, 1 Drawing Sheet

Figure 1:
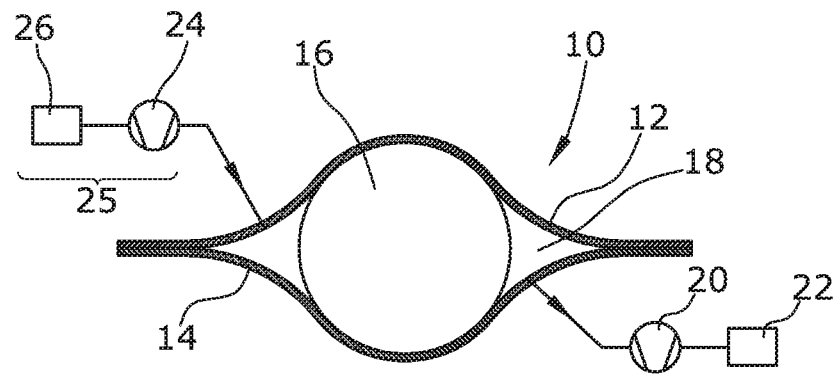

(58) Field of Classification Search
USPC .................................................. 73/40.7, 49.3
See application file for complete search history.

(56) References Cited

U.S. PATENT DOCUMENTS

| | | | | |
|---|---|---|---|---|
| 6,082,184 | A * | 7/2000 | Lehmann | G01M 3/3281 |
| | | | | 73/49.3 |
| 6,354,142 | B1 * | 3/2002 | Nothhelfer | G01M 3/227 |
| | | | | 73/40.7 |
| 6,513,366 | B1 * | 2/2003 | Stauffer | G01M 3/329 |
| | | | | 73/49.3 |
| 6,955,076 | B1 * | 10/2005 | Widt | G01M 3/227 |
| | | | | 73/40.7 |
| 9,784,639 | B2 * | 10/2017 | Wetzig | G01M 3/3281 |
| 9,810,600 | B2 * | 11/2017 | Wetzig | G01M 3/36 |
| 10,247,637 | B2 * | 4/2019 | Wetzig | G01M 3/3281 |
| 10,514,317 | B2 * | 12/2019 | Wetzig | G01M 3/3281 |
| 2001/0003917 | A1 * | 6/2001 | Sagi | G01M 3/04 |
| | | | | 73/40 |
| 2003/0233866 | A1 | 12/2003 | Widt | |
| 2004/0159144 | A1 * | 8/2004 | Abelen | G01M 3/227 |
| | | | | 73/49.3 |
| 2007/0157704 | A1 * | 7/2007 | Jenneus | G01M 3/226 |
| | | | | 73/40.7 |
| 2012/0037795 | A1 * | 2/2012 | Lehmann | G01M 3/227 |
| | | | | 250/282 |
| 2013/0025349 | A1 * | 1/2013 | Solomon | G01M 3/22 |
| | | | | 73/40.7 |
| 2014/0311222 | A1 * | 10/2014 | Decker | G01M 3/3218 |
| | | | | 73/40 |
| 2014/0326051 | A1 * | 11/2014 | Wetzig | G01M 3/3281 |
| | | | | 73/40 |
| 2015/0308916 | A1 * | 10/2015 | Nelles | G01M 3/042 |
| | | | | 73/40.7 |
| 2016/0209294 | A1 * | 7/2016 | Wetzig | G01M 3/3281 |
| 2016/0258448 | A1 * | 9/2016 | Decker | F04F 5/54 |
| 2019/0145852 | A1 * | 5/2019 | Decker | G01M 3/3209 |
| | | | | 73/49.3 |

FOREIGN PATENT DOCUMENTS

| | | |
|---|---|---|
| DE | 102007057944 A1 | 6/2009 |
| DE | 102011086486 A1 | 5/2013 |
| JP | 10-185752 | 7/1998 |
| JP | 2011-117773 | 6/2011 |
| WO | 2002/014822 | 2/2002 |
| WO | 2005/054806 A1 | 6/2005 |
| WO | 2011/012730 | 2/2011 |
| WO | 2016/087280 | 6/2016 |

* cited by examiner

LEAK-TIGHTNESS TEST WITH CARRIER GAS IN FOIL CHAMBER

This application is a National Stage of International Application No. PCT/EP2015/077636, filed Nov. 25, 2015, and entitled LEAK-TIGHTNESS TEST WITH CARRIER GAS IN FOIL CHAMBER, which claims the benefit of DE 10 2014 224 799.3, filed Dec. 3, 2014. This application claims priority to and incorporates herein by reference the above-referenced applications in their entirety.

The invention relates to a method for performing a leak-tightness test on a test object in a foil chamber.

It is known to fill test objects, e.g. food packages, with a test gas and to place them into a foil chamber which then is evacuated to subsequently detect test gas escaping from the test object into the foil chamber. In many cases gas already present in the test object (packaging bags) may be used as the test gas. This may be a protective gas or gas components in the air, e.g. nitrogen, oxygen or carbon dioxide. Aromatic substances of the packaged food, e.g. coffee, contained in the package may also be used as the test gas. As another possibility, gases may be used as the test gas, which are produced in the package by the packaged food, such as carbon dioxide that is produced in a coffee package after a few hours.

Owing to the fact that the pressure in the foil chamber is lower in the region of the test object than inside the test object, test gas will escape through a possible leak in the test object. In the known methods the development of the pressure increase in the foil chamber is monitored so as to conclude on a possible leak. If the pressure increase exceeds a defined extent, this may be considered an indication to the existence of a leak in the test object.

Further, it is known, e.g. from WO 2005/054806 A1, to pass a carrier gas flow through a test chamber containing a test object. Here, the test chamber is flushed with the carrier gas. Test gas escaping from the test object is transported out of the test chamber together with the carrier gas flow and is supplied to a test gas sensor. However, a leak-tightness test using a carrier gas has so far not been performed using evacuated foil chambers. Rather, the carrier gas flow was supplied to a rigid test chamber with a constant test chamber volume. Here, the carrier gas stream must be sufficiently large to flush test gas out of the predetermined test chamber volume and transport it to the sensor. This results in a drawback that the concentration of test gas, which is obtained in the measured gas flow at a predetermined leakage rate from the test object, is the lower, the larger the chosen carrier gas flow is. The detection limit for the test gas thus depends on the magnitude of the carrier gas flow. The sensitivity of the leakage gas detection can thus not be increased randomly by reducing the carrier gas flow.

It is an object of the invention to provide a more sensitive method for performing a leak-tightness test.

According to the invention this is achieved with the features of claim 1 by placing the test object in a foil chamber, functioning as the test chamber, into which the test gas is supplied. The foil chamber is characterized by comprising at least one flexible wall region which, upon evacuation, is drawn to the test object and reduces the volume of the foil chamber. In this regard, foil chambers are particularly advantageous whose walls are entirely made of a flexible foil. As the test chamber is evacuated, the film clings to the test object. The volume in the foil chamber in the region outside the test object is reduced. Thus, a smaller carrier gas flow can be supplied to the foil chamber than in the conventional case of a rigid test chamber having an invariable volume. Due to the smaller carrier gas flow, the detection limit is increased compared to a leak-tightness test using a test chamber with rigid walls.

The volume flow of the carrier gas supplied preferably is once the gas content of the chamber per second. The pressure in the foil chamber in the region outside the test object should be at most 700 mbar during the measuring of the test gas concentration. The test gas is supplied to the test object before and/or during the measuring of the test gas proportion in the gas mixture of carrier gas and test gas formed. The test gas pressure in the test object should always be higher than the foil chamber pressure during the measuring. Preferably, the test gas pressure in the test object should be at least 1000 mbar.

Before being placed into the test chamber, the test object may actively be filled with a separate test gas. As an alternative, a gas or gas components already contained in the test object may be used as the test gas. These may be components of air, e.g. nitrogen, oxygen or carbon dioxide. It is also possible to use gases as the test gas that contain aromatic substances of a product contained in the test object or are made of the same. The product contained in the test object may be a food product, e.g. coffee. In this regard, it is possible to use aromatic substances of coffee as the test gas. Another possibility is to use gases or gas components as the test gas, which are produced in the test object by a product (e.g. a food product) contained in the test object. For example, after a few hours, coffee produces $CO_2$ in a coffee package, which could be used as the test gas.

Conceivable test gases are $SF_6$, forming gas or He. $CO_2$ is a particularly advantageous test gas. Air may be used as the carrier gas. Nitrogen is particularly advantageous as a carrier gas.

The carrier gas flow may be continuously supplied to the foil chamber during the measuring by means of a carrier gas conveying means (conveyor pump). As an alternative, the effect that, due to the vacuum and to natural permeation, gas components are gassed out from the surfaces of the inner sides of the foil chamber walls can also be used to obtain a carrier gas. These gas components are gassed out constantly in dependence on the foil chamber pressure. The quantity of the outgassing components thus defines the volume flow of carrier gas supplied to the foil chamber. When measuring the test gas concentration, the quantity of test gas is determined and set in proportion to the quantity of the carrier gas, i.e. of the gassed out components, in the gas flow measured.

If the test gas concentration exceeds a predetermined value of e.g. 5 ppm, this serves as an indication of a leak in the test object.

As an alternative it is conceivable that a predetermined carrier gas volume is supplied to the foil chamber only once, before the concentration of test gas is measured. The carrier gas volume can be supplied to the foil chamber before or after the accumulation time has lapsed. The accumulation time is considered to be the time passing after the evacuation of the foil chamber and before the measuring of the concentration of the test gas, so that sufficient measurable test gas can escape from the test object through a possible leak.

The alternative offers the advantage that the sensitivity of the measuring can be augmented by increasing the accumulation time without reducing the quantity of carrier gas.

The method of the present invention has the basic advantage that the detection limit for the leak-tightness test can be lowered by reducing the test chamber volume (volume of the foil chamber in the region outside the test object). For being flushed with carrier gas, the small foil chamber volume also requires a smaller quantity of gas and less time than in the case of a rigid test chamber with a predetermined volume. If the gas components gassed out from the foil by natural permeation are used as the carrier gas, there is a further advantage that no separate carrier gas has to be actively supplied to the foil chamber.

Figure 2:
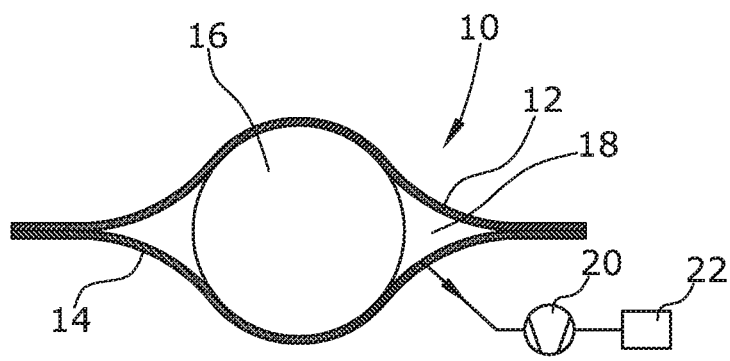
Figure 3:
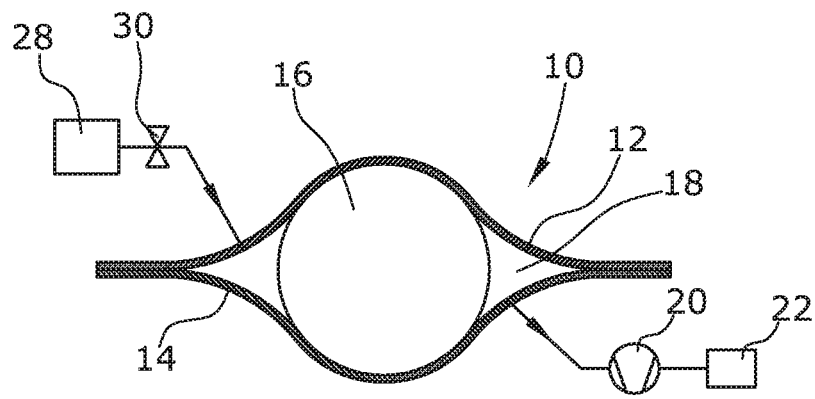

Embodiments of the invention are explained in more detail hereunder with reference to the Figures. In the Figures:

FIG. 1 shows an embodiment with a continuous carrier gas supply by means of a conveyor means, FIG. 2 shows an embodiment in which components gassed out from the foil are used as a continuous carrier gas flow, and FIG. 3 shows an embodiment for a one-time supply of a predetermined quantity of carrier gas.

In each embodiment the foil chamber 10 is formed by two foil layers 12, 14. The foils 12, 14 may be flexible foils sealingly laid one upon the other in their outer edge regions. The test object 16 is contained in the foil chamber 10. The foil chamber volume 18 in the region outside the test object 16 is connected in a gas-carrying manner to a vacuum pump 20 for the evacuation of the foil chamber. The gas quantity evacuated by the vacuum pump 20 is supplied to a gas sensor 22 for determining the concentration of test gas in the evacuated gas mixture. The gas sensor 22 may e.g. be a mass spectrometer.

In the first embodiment illustrated in FIG. 1, the foil chamber volume 18 is additionally connected in a gas-carrying manner to a conveyor pump 24 and a carrier gas source 26. The conveyor pump 24 and the carrier gas sources 26 form a carrier gas conveying means 25 for supplying a continuous flow of carrier gas to the foil chamber. The conveyor pump 24 conveys the carrier gas contained in the carrier gas source 26 into the foil chamber 10. As an alternative, a throttle may be used instead of a conveyor pump 24.

The embodiment shown in FIG. 2 differs from the first embodiment in that no carrier gas conveying means is provided. After the evacuation of the foil chamber 10, the gas components which gas out from the inner surfaces of the foil chamber walls 12, 14 due to natural permeation, are used as the carrier gas. The permeation of these gas components occurs in a constant manner.

The third embodiment illustrated in FIG. 3 differs from the first embodiment in that the foil chamber volume 18 is not connected to a carrier gas conveying means, but is connected to a carrier gas source 28 instead which has a constant carrier gas volume (e.g. atmospheric pressure). After the evacuation of the foil chamber 10 by means of the vacuum pump 20, the valve 30 in the gas-carrying connection between the carrier gas source 28 and the foil chamber 10 is opened, whereby the carrier gas volume abruptly flows into the foil chamber 10.

For the three embodiments, the method is performed as follows:

In the first embodiment the foil chamber volume 18 is reduced by evacuating the foil chamber 10 using the vacuum pump 20. Then, a reduced carrier gas flow is continuously supplied to the foil chamber 10 using the carrier gas conveying means 25, while the gas flow drawn from the foil chamber 10 by means of the vacuum pump 20 is analyzed by the sensor 22. The sensor 22 determines the concentration of test gas in the measured gas flow. In case of a leak, the measured gas flow contains a mixture of the carrier gas and the test gas. The concentration c of test gas in the carrier gas flow is:

$$c = \frac{Q_{Leak}}{Q_{Fl}} + \left(c_0 - c_0 \frac{Q_{Leak}}{Q_{Fl}}\right)$$

Here, the first term stands for the concentration of test gas through the leak and the second term stands for the substitution of the initially existing concentration of test gas with test gas from the leak. One may also write:

$$c = \frac{Q_{Leak}}{Q_{Fl}}(1 - c_0) + c_0$$

where: c total concentration of test gas
$c_0$ initial concentration of test gas in the carrier gas flow
$Q_{Leck}$ test gas leakage rate from the leak
$Q_{Fl}$ carrier gas flow In the second embodiment, the foil chamber volume 18 is reduced by evacuation of the foil chamber 10 using the vacuum pump 20. In each embodiment the test object 16 has been filled with a test gas before. Using the vacuum pump 20 an approximately continuous gas flow is supplied to the sensor 22. Here, the gas escaping inward by permeation from the foils 12, 14 is used as the carrier gas. The proportion of the test gas in this gas flow is determined using the sensor 22.

In the third embodiment, the valve 30 is opened after the evacuation of the foil chamber 10. The carrier gas volume contained in the carrier gas source 28 then flows into the foil chamber 10. After a predetermined accumulation time has lapsed, in which test gas can escape into the foil chamber volume 18 through a possible leak in the test object 16, the sensor 22 determines the concentration of test gas. The carrier gas volume from the carrier gas source 28 can be supplied to the foil chamber volume 18 before, during or after the lapse of the accumulation time.

The invention claimed is:

1. A method for performing a leak-tightness test on a test object in a foil chamber which has at least one flexible wall region, wherein the test object comprises a test gas contained within the test object, the method comprising the following steps:
    introducing the test object into the foil chamber;
    evacuating the foil chamber to a pressure lower than the pressure of the test gas within the test object and lower than atmospheric pressure;
    continuously introducing a carrier gas into the foil chamber by natural permeation through the foil chamber wall from outside the foil chamber, thereby forming a carrier gas flow from gas components gassing out from an inner surface of the foil chamber wall facing the test object due to the vacuum in the foil chamber without actively supplying any external carrier gas from outside of the foil chamber using a conveyor means, the carrier gas passes through the foil chamber through a region outside the test object; and
    measuring a test gas concentration of a gas mixture that forms in the foil chamber in the region outside the test object, wherein the concentration of the test gas decreases after introducing the carrier gas.

2. The method of claim 1, wherein the foil chamber is evacuated to a pressure of at most circa 700 mbar before measuring the test gas concentration.

3. The method of claim 1, wherein nitrogen, oxygen or carbon dioxide is used as the test gas.

4. The method of claim 1, wherein aromatic substances from a product packaged in the test object are used as the test gas.

5. The method of claim 1, wherein a gas is used as the test gas, which gas is produced by a product packaged in the test object.

6. The method of claim 1, wherein the test object is filled with a test gas before being placed into the test chamber.

* * * * *